United States Patent
Park

(10) Patent No.: US 9,597,953 B2
(45) Date of Patent: Mar. 21, 2017

(54) HYBRID VEHICLE POWER TRAIN

(71) Applicant: Hyundai Motor Company, Seoul (KR)

(72) Inventor: Jong Yun Park, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/670,865

(22) Filed: Mar. 27, 2015

(65) Prior Publication Data

US 2016/0146311 A1    May 26, 2016

(30) Foreign Application Priority Data

Nov. 25, 2014    (KR) .................. 10-2014-0165018

(51) Int. Cl.
| | |
|---|---|
| *B60K 6/445* | (2007.10) |
| *B60K 6/365* | (2007.10) |
| *B60K 6/383* | (2007.10) |
| *F16H 3/72* | (2006.01) |
| B60K 6/38 | (2007.10) |
| F16H 37/08 | (2006.01) |

(52) U.S. Cl.
CPC .............. *B60K 6/445* (2013.01); *B60K 6/365* (2013.01); *B60K 6/383* (2013.01); *F16H 3/728* (2013.01); B60K 2006/381 (2013.01); F16H 2037/0873 (2013.01); Y10S 903/911 (2013.01)

(58) Field of Classification Search
CPC . F16H 3/72; F16H 3/727; F16H 3/728; F16H 2200/2082; B60K 6/445; B60K 2006/4808
See application file for complete search history.

(56) References Cited

U.S. PATENT DOCUMENTS

| | | | |
|---|---|---|---|
| 6,159,127 A | 12/2000 | Loeffler et al. | |
| 6,558,283 B1 | 5/2003 | Schnelle | |
| 6,634,986 B2 | 10/2003 | Kima | |
| 6,840,341 B2 | 1/2005 | Fujikawa | |
| 8,512,187 B2 | 8/2013 | Puiu et al. | |
| 8,734,281 B2 | 5/2014 | Ai et al. | |
| 9,316,291 B2 | 4/2016 | Lee et al. | |
| 2003/0232678 A1* | 12/2003 | Yamauchi | B60K 6/365 475/5 |
| 2008/0171625 A1 | 7/2008 | Goldschmidt et al. | |
| 2009/0011887 A1 | 1/2009 | Komada et al. | |

(Continued)

FOREIGN PATENT DOCUMENTS

| | | |
|---|---|---|
| JP | 2005-132365 A | 5/2005 |
| JP | 2006-77859 A | 3/2006 |

(Continued)

*Primary Examiner* — Jacob S Scott
(74) *Attorney, Agent, or Firm* — Morgan, Lewis & Bockius LLP

(57) ABSTRACT

A hybrid vehicle power train may include a first planetary gear unit including a first rotation element operated as a selective fixed element by a first friction member, a second rotation element connected to a first electric motor by an electric input shaft to be operated as a selective input element, and a third rotation element connected to an output shaft through an external gear to be operated as a selective output element, and a one-way clutch rotating the external gear relative to the electric input shaft or rotating the external gear along with rotation of the electric input shaft, according to rotational speed of the electric input shaft and the external gear.

8 Claims, 6 Drawing Sheets

(56) References Cited

U.S. PATENT DOCUMENTS

| | | |
|---|---|---|
| 2009/0170649 A1 | 7/2009 | Murakami et al. |
| 2010/0000814 A1 | 1/2010 | Katsuta et al. |
| 2010/0044128 A1 | 2/2010 | Oba et al. |
| 2012/0310461 A1 | 12/2012 | Maruyama et al. |
| 2015/0018152 A1* | 1/2015 | Kato ............... B60W 10/02 475/5 |
| 2015/0111682 A1* | 4/2015 | Park .................. F16H 3/44 475/151 |

FOREIGN PATENT DOCUMENTS

| | | |
|---|---|---|
| JP | 2007-69843 A | 3/2007 |
| JP | 2008-56236 A | 3/2008 |
| JP | 2008-174163 A | 7/2008 |
| JP | 2012-519617 A | 8/2012 |
| JP | 2013-86654 A | 5/2013 |
| KR | 10-2007-0079672 A | 8/2007 |
| KR | 10-0893438 B1 | 4/2009 |
| KR | 10-0996132 B1 | 11/2010 |
| KR | 10-1144501 B1 | 5/2012 |
| KR | 10-2012-0140099 A | 12/2012 |
| KR | 10-2013-0056128 A | 5/2013 |
| KR | 10-2013-0056640 A | 5/2013 |
| KR | 10-2013-0066225 A | 6/2013 |
| KR | 10-2014-0079242 B1 | 6/2014 |
| KR | 10-2014-0080638 A | 7/2014 |
| KR | 10-1428421 B1 | 8/2014 |
| WO | WO 2010101296 A1 | 9/2010 |

\* cited by examiner

<FIRST SPEED IN EV MODE>

HYBRID VEHICLE POWER TRAIN

CROSS-REFERENCE(S) TO RELATED APPLICATIONS

The present application claims priority of Korean Patent Application Number 10-2014-0165018 filed on Nov. 25, 2014, the entire contents of which application are incorporated herein for all purposes by this reference.

BACKGROUND OF THE INVENTION

Field of the Invention

Exemplary embodiments of the present invention relate to a power train applied to a hybrid vehicle.

Description of Related Art

A hybrid vehicle is a vehicle driven by combining power of an electric motor and power of an internal combustion engine. The hybrid vehicle has been commercially used as an alternative of an eco-friendly vehicle since the hybrid vehicle is operated and controlled by the engine and the electric motor at a mode in which a system has high efficiency, to thereby have high efficiency and effectively reduce exhaust gas.

Such a hybrid vehicle has a power split system configured of a mechanical flow in which power of the engine is directly transferred to an output shaft using a power split device such as a planetary gear for splitting power, and an electric flow in which a generator generates electric power using the power of the engine and a battery is charged using the generated electric power or the motor is driven by energy of the charged battery.

The power split type hybrid system has advantages in that the engine may be operated independently of the output shaft and be freely turned on/off during traveling, and an electric vehicle mode may be realized.

In addition, in the power split type hybrid system, the engine may be effectively driven by an EVT (Electrically Variable Transmission) using two motor generators and a transmission is basically unnecessary since the motor has torque which is uniformly output according to the speed thereof.

However, the transmission is required in order for the vehicle to have high speed and low torque.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid vehicle power train in which a speed change formed by driving of a motor is performed in a multistage manner so as to improve traveling performance of a vehicle and cost and weight of the motor are reduced by decreasing a capacity of the motor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In an aspect of the present invention, a hybrid vehicle power train may include a first planetary gear unit having a first rotation element operated as a selective fixed element by a first friction member, a second rotation element connected to a first electric motor by an electric input shaft to be operated as an input element, and a third rotation element connected to an output shaft through an external gear to be operated as an output element, and a one-way clutch rotating the external gear relative to the electric input shaft or rotating the external gear along with rotation of the electric input shaft, according to rotational speed of the electric input shaft and the external gear.

The hybrid vehicle power train may further include a second planetary gear unit having a first rotation element connected to a second electric motor to be operated as a selective input element or a selective fixed element, a second rotation element operated as an input element by provision of engine power, and a third rotation element connected to the output shaft to be operated as an output element.

In the first planetary gear unit, the first rotation element is a sun gear, the second rotation element is a carrier, and the third rotation element is a ring gear, wherein the first friction member is a brake fixed to a transmission case.

In the second planetary gear unit, the first rotation element is a sun gear, the second rotation element is a carrier, and the third rotation element is a ring gear.

The first rotation element of the second planetary gear unit is connected to a second friction member to be operated as a selective fixed element.

The second friction member is a brake fixed to a transmission case, or is a dog clutch selectively fastened between the transmission case and the first rotation element.

The one-way clutch is provided between the electric input shaft and the external gear, and the one-way clutch and the electric input shaft are concentrically formed.

The external gear is engaged with an output gear provided on the output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

DESCRIPTION OF SPECIFIC EMBODIMENTS

Figure 1:
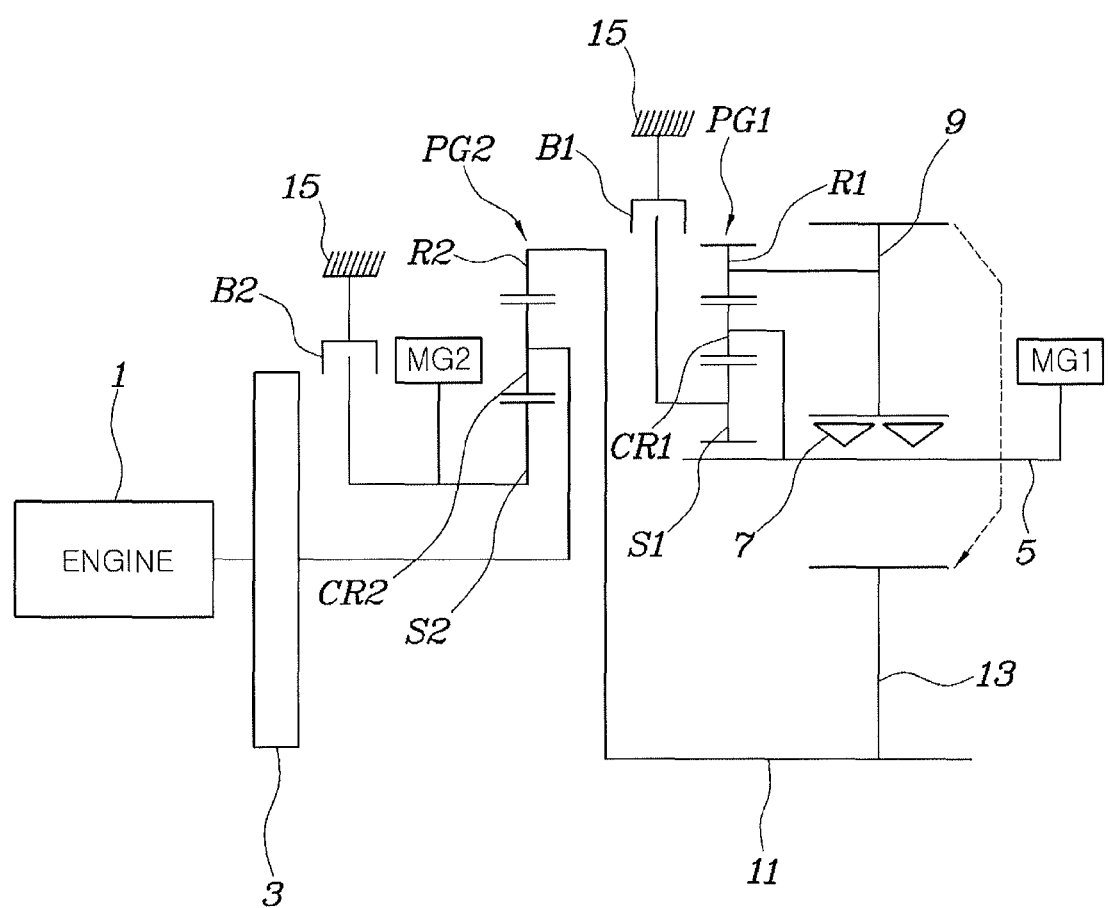
FIG. 1 is a diagram schematically illustrating an arrangement form of a hybrid vehicle power train according to an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various FIGS. and embodiments of the present invention.

A hybrid vehicle power train according to an exemplary embodiment of the present invention includes a first planetary gear unit PG1 and a one-way clutch 7.

The exemplary embodiment of the present invention will be described in detail with reference to FIG. 1. First, the first planetary gear unit PG1 includes a first rotation element operated as a selective fixed element by a first friction member B1, a second rotation element connected to a first electric motor MG1 by an electric input shaft 5 so as to be operated as an input element, and a third rotation element connected to an output shaft 11 through an external gear 9 so as to be operated as a selective output element.

For example, in the first planetary gear unit PG1, the first rotation element may be a first sun gear S1, the second rotation element may be a first carrier CR1, and the third rotation element may be a first ring gear R1.

The first friction member B1 may be a brake fixed to a transmission case 15.

That is, the first sun gear S1 of the first planetary gear unit PG1 is connected to the first friction member B1 such that braking may be performed, the first carrier CR1 is connected to the first electric motor MG1 to be selectively supplied with rotational force from the first electric motor MG1, and the first ring gear R1 is connected to the external gear 9 to transfer the rotational force to the output shaft 11 through the external gear 9.

In particular, the one-way clutch 7 of the present invention rotates the external gear 9 relative to the electric input shaft 5 or rotates the external gear 9 along with rotation of the electric input shaft 5, according to rotational speed of the electric input shaft 5 and the external gear 9.

For example, the one-way clutch 7 is provided between the electric input shaft 5 and the external gear 9, and the one-way clutch 7, the electric input shaft 5, and the external gear 9 are concentrically formed.

The external gear 9 is engaged with an output gear 13 provided on the output shaft 11, so that rotational force of the first electric motor MG1 input through the external gear 9 is reduced through the output gear 13, thereby rotating the output shaft 11.

Accordingly, in accordance with the present invention, a vehicle may travel at first and second speeds in EV mode by a selective braking operation of the first friction member B1, and thus a speed change according to driving of the motor is performed in a multistage manner. Consequently, EV traveling performance of the vehicle is improved and cost and weight of a motor are reduced by decreasing a capacity of the motor.

Meanwhile, the hybrid vehicle power train according to the exemplary embodiment of the present invention the present invention may further include a second planetary gear unit PG2 which may split power of an engine 1 or a second electric motor MG2 and provide the split power to the output shaft 11.

Referring to FIG. 1 in more detail, the second planetary gear unit PG2 may include a first rotation element connected to the second electric motor MG2 so as to be operated as a selective input element or a selective fixed element, a second rotation element operated as a selective input element by provision of power of the engine 1, and a third rotation element connected to the output shaft 11 so as to be operated as a selective output element.

For example, in the second planetary gear unit PG2, the first rotation element may be a second sun gear S2, the second rotation element may be a second carrier CR2, and the third rotation element may be a second ring gear R2.

The first rotation element of the second planetary gear unit PG2 may be connected to a second friction member B2 so as to be operated as a selective fixed element.

Figure 6:
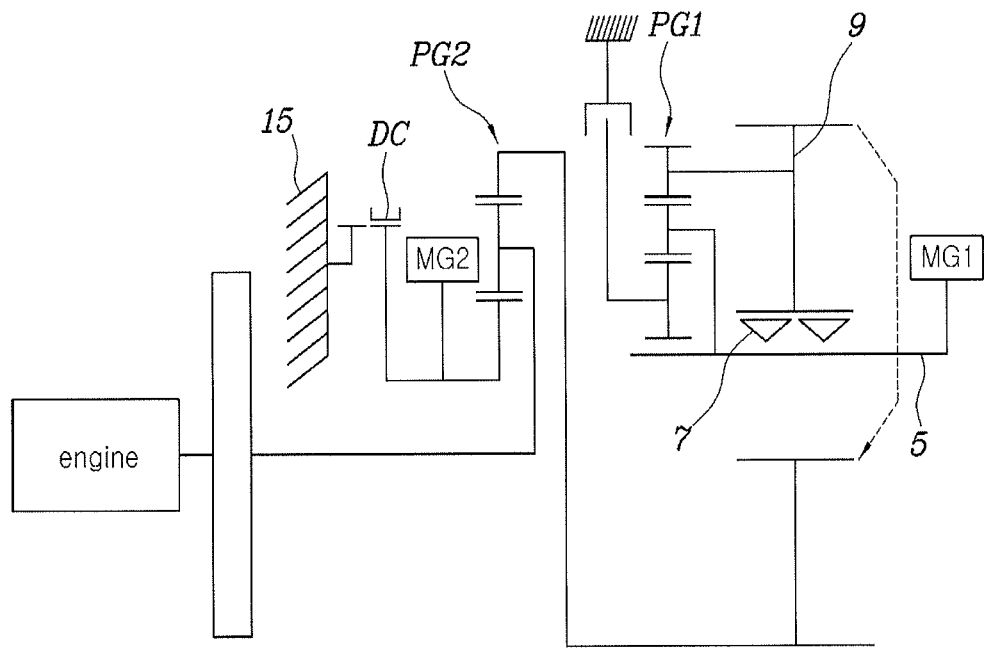
FIG. 6 is a diagram illustrating a structure of a hybrid vehicle power train according to another embodiment of the present invention.

In this case, the second friction member B2 may be a brake fixed to the transmission case 15 as shown in FIG. 1, or may be a dog clutch DC which is selectively fastened between the transmission case 15 and the first rotation element as shown in FIG. 6. For example, when the dog clutch DC is used as the second friction member B2, the dog clutch DC may be stably fastened by controlling revolutions per minute of the second electric motor MG2.

Figure 7:
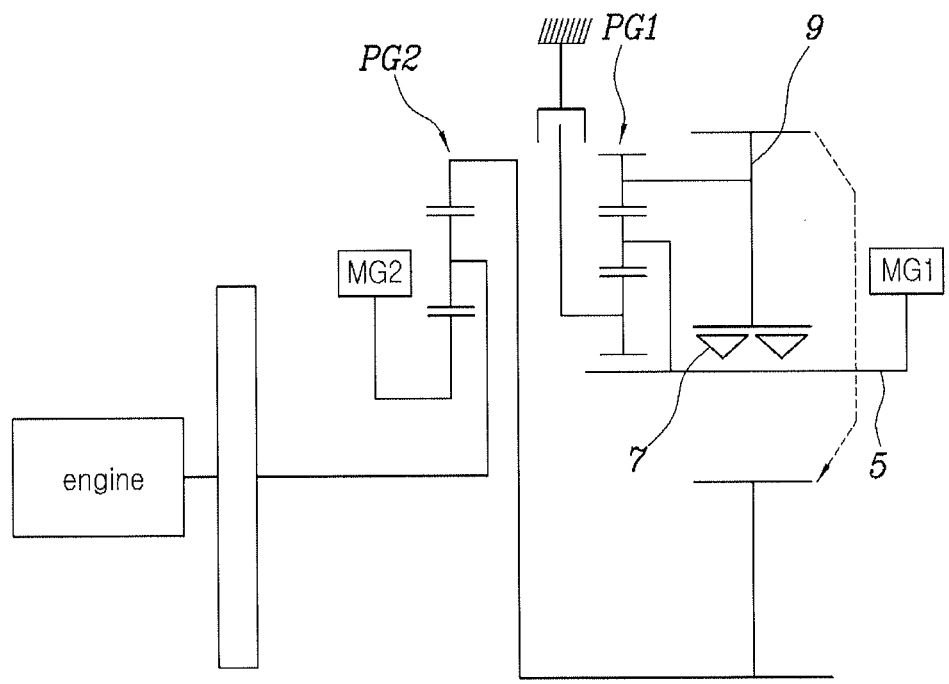
FIG. 7 is a diagram illustrating a structure of a hybrid vehicle power train according to a further embodiment of the present invention.

When the second friction member B2 is not used as shown in FIG. 7, an electric load loss may be generated when the vehicle travels at high speed in an engine EVT mode. However, the vehicle may also travel by fixing the second sun gear S2 of the second planetary gear unit PG2 through control of the second electric motor MG2.

Here, the second electric motor MG2 and the first electric motor MG1 may be a motor generator which provides or generates electric power.

That is, the second sun gear S2 of the second planetary gear unit PG2 is connected to the second friction member B2 such that braking may be performed, the second carrier CR2 is connected to the engine 1 to be selectively supplied with rotational force from the engine 1, and the second ring gear R2 is connected to the output shaft 11 to transfer the rotational force to the output shaft 11.

In this case, a torsion damper 3 may be provided between the engine 1 and the second carrier CR2, thereby reducing torsional vibration.

Accordingly, in accordance with the present invention, the vehicle may travel in an engine EVT (Electrically Variable Transmission) mode or an engine OD (Over Drive) mode by a selective braking operation of the second friction member B2. In addition, a speed change is performed in a multistage manner by realization of an HEV mode in such a manner that the vehicle complexly travels at first and second speeds in EV mode. Consequently, high traveling performance of the vehicle is improved.

Hereinafter, a power flow for each traveling mode of the vehicle using the present invention will be described.

[EV Mode]

Figure 2A:
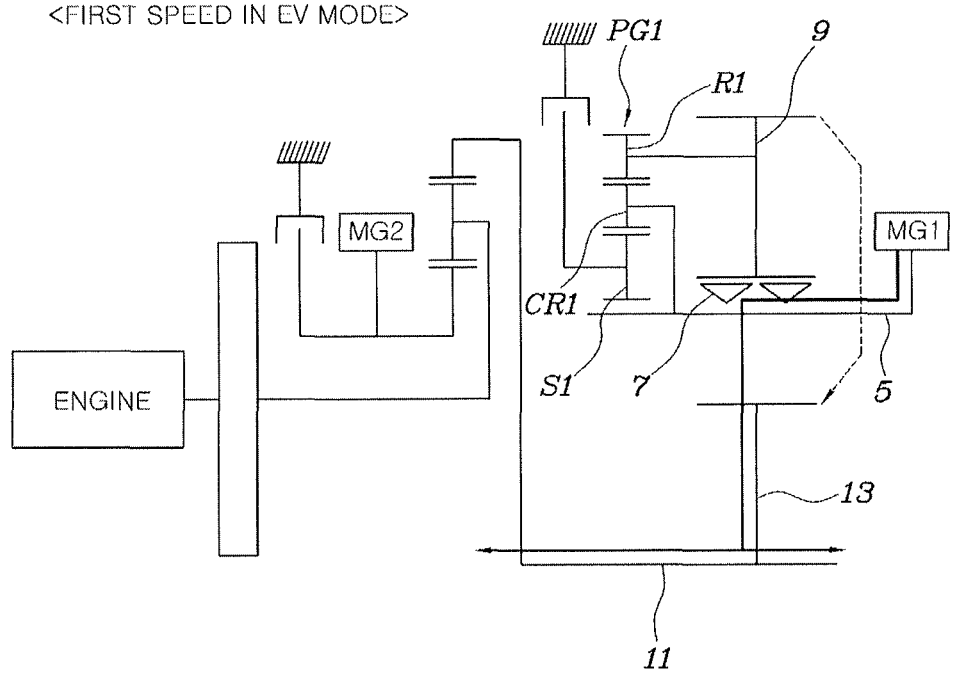
FIGS. 2A and 2B are diagrams for explaining a power flow when a vehicle travels at a first speed in EV mode according to the exemplary embodiment of the present invention.
Figure 2B:
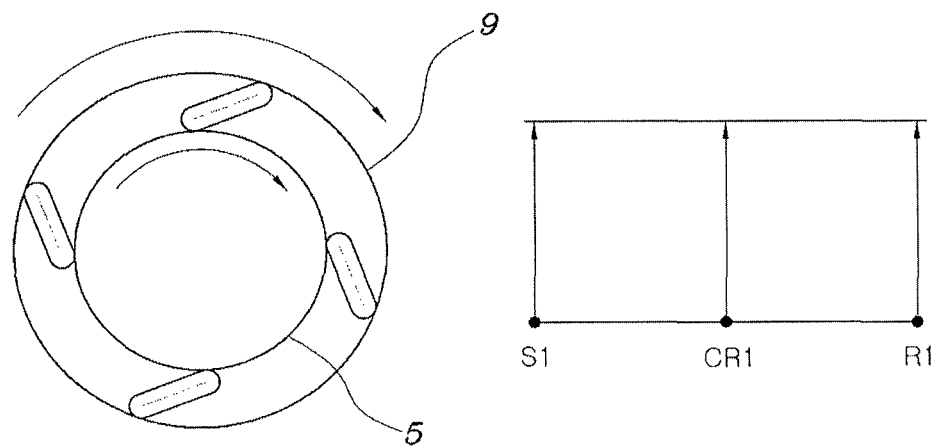

Referring to FIGS. 2A and 2B, the electric input shaft 5 is rotated by power provided from the first electric motor MG1. In this case, the one-way clutch 7 is operated in a direction in which an inner race pulls an outer race, and thus the electric input shaft 5 drives the external gear 9.

That is, the rotational force of the first electric motor MG1 is directly output through the external gear 9 without passing through the first planetary gear unit PG1, thereby enabling the vehicle to travel at the first speed in EV mode.

Figure 3A:
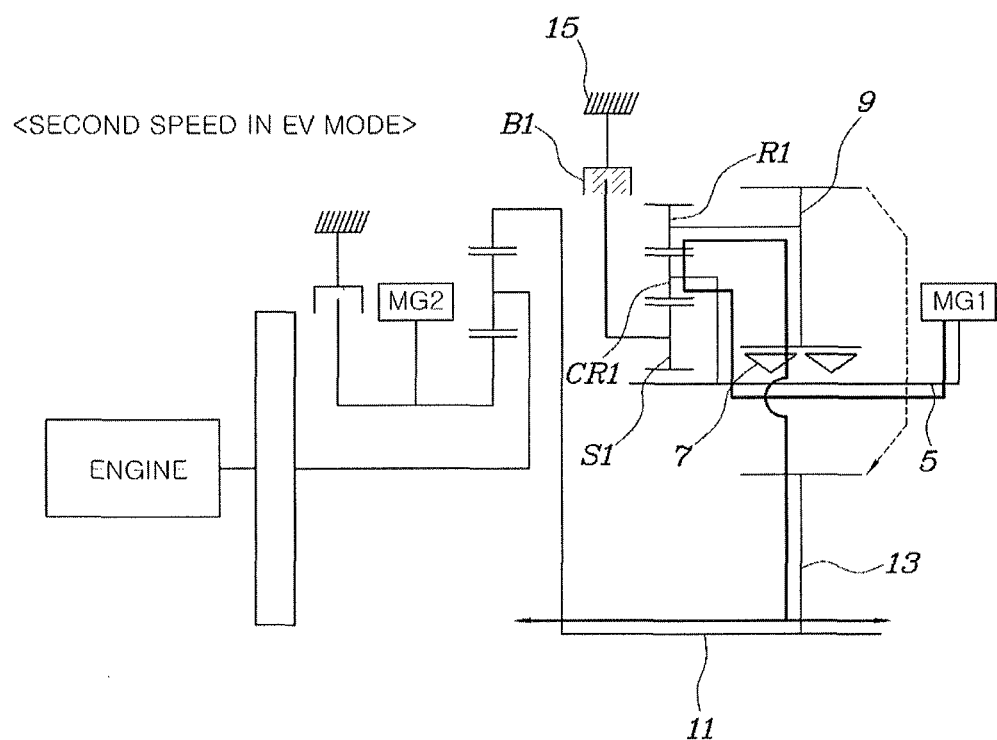
FIGS. 3A and 3B are diagrams for explaining a power flow when the vehicle travels at a second speed in EV mode according to the exemplary embodiment of the present invention.
Figure 3B:
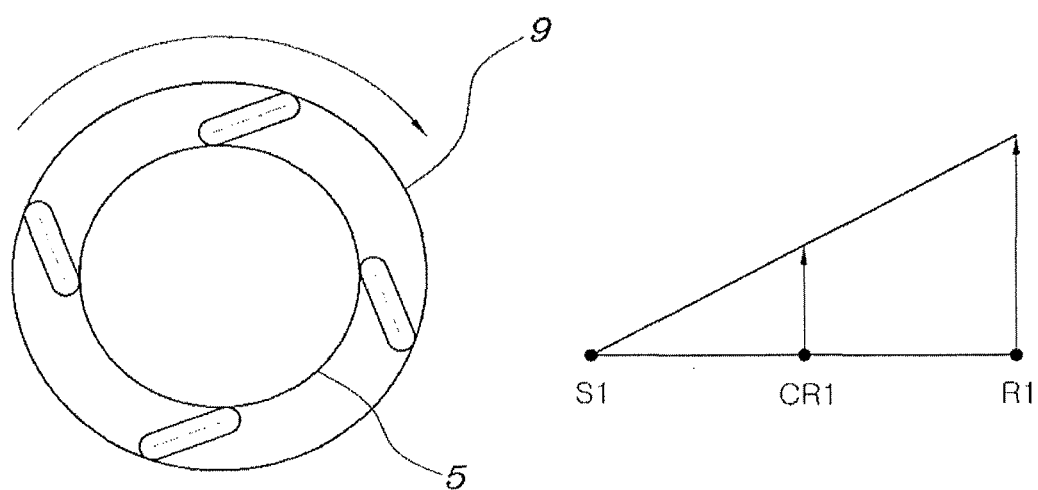

Next, referring to FIGS. 3A and 3B, the electric input shaft 5 is rotated by power provided from the first electric motor MG1. In this case, the first sun gear S1 is fixed by the first friction element when the vehicle speed is changed from the first speed in EV mode to the second speed in EV mode, thereby allowing the rotational force to be output through the external gear 9 while the first ring gear R1 is accelerated.

That is, in this case, rotational speed of the external gear 9 is higher than rotational speed of the electric input shaft 5 by a gear ratio of the first planetary gear unit PG1. Therefore, the one-way clutch idles instead of operating, and thus the vehicle travels at the second speed in EV mode.

In this case, when the vehicle speed is changed from the first speed in EV mode to the second speed in EV mode, slip control is performed by the first friction member B1 so as to prevent a torque drop caused during shift of the gear.

[Engine EVT Mode+EV Mode]

Figures 4A, 4B:
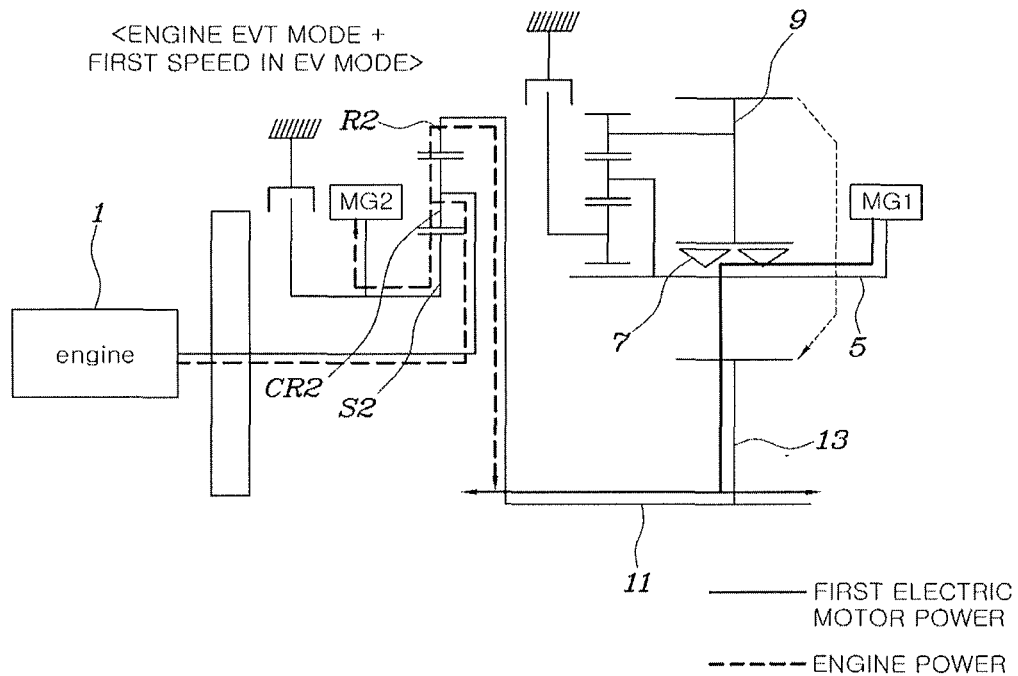
FIGS. 4A and 4B are diagrams for explaining a power flow when the vehicle travels at first and second speeds in EV mode in an engine EVT mode according to the exemplary embodiment of the present invention.

Referring to FIG. 4A, when power of the engine 1 is input to the second carrier CR2, the power of the engine 1 may be used to generate and output electric power while being split (power-split) to the second electric motor MG2 and the output shaft 11 through the second sun gear S2 and the second ring gear R2 by control of the second electric motor MG2, or the power of the engine 1 may be supplied to the output shaft 11 together with electric power of the second electric motor MG2.

Here, FIGS. 4A and 4B illustrate a flow in which the power of the engine 1 is split.

As such, the vehicle may travel at the first speed in EV mode by the electric power provided from the first electric motor MG1, as described above. Therefore, the vehicle may travel in a combined mode of the engine EVT mode and the first speed in EV mode.

Next, referring to FIG. 4B, when power of the engine 1 is input to the second carrier CR2, the power of the engine 1 may be split by the second planetary gear unit PG2 or may be supplied to the output shaft 11 together with electric power of the second electric motor MG2, similarly to the above method.

As such, the vehicle may travel at the second speed in EV mode through the speed change from the first speed in EV mode to the second speed in EV mode by the electric power provided from the first electric motor MG1, as described above. Therefore, the vehicle may travel in a combined mode of the engine EVT mode and the second speed in EV mode.

[Engine OD Mode+EV Mode]

Figure 5A:
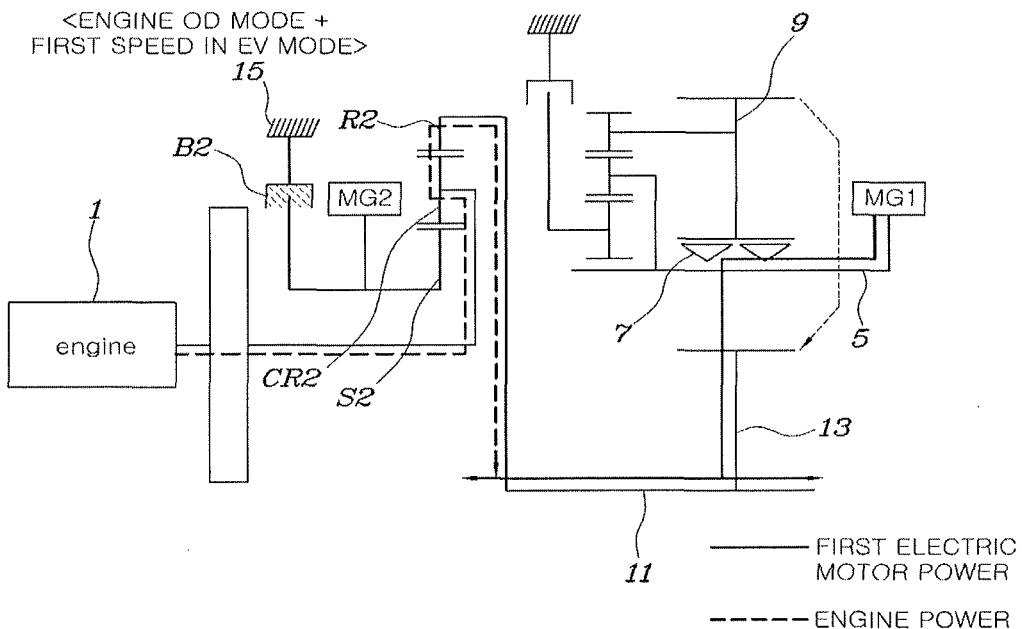
FIGS. 5A and 5B are diagrams for explaining a power flow when the vehicle travels at first and second speeds in EV mode in an engine OD mode according to the exemplary embodiment of the present invention.

Referring to FIG. 5A, since the second sun gear S2 is fixed by the second friction member B2 when power of the engine 1 is input to the second carrier CR2, the power of the engine 1 is increased through the second ring gear R2 and the increased power is provided to the output shaft 11.

As such, the vehicle may travel at the first speed in EV mode by the electric power provided from the first electric motor MG1, as described above. Therefore, the vehicle may travel in a combined mode of the engine EVT mode and the first speed in EV mode.

Figure 5B:
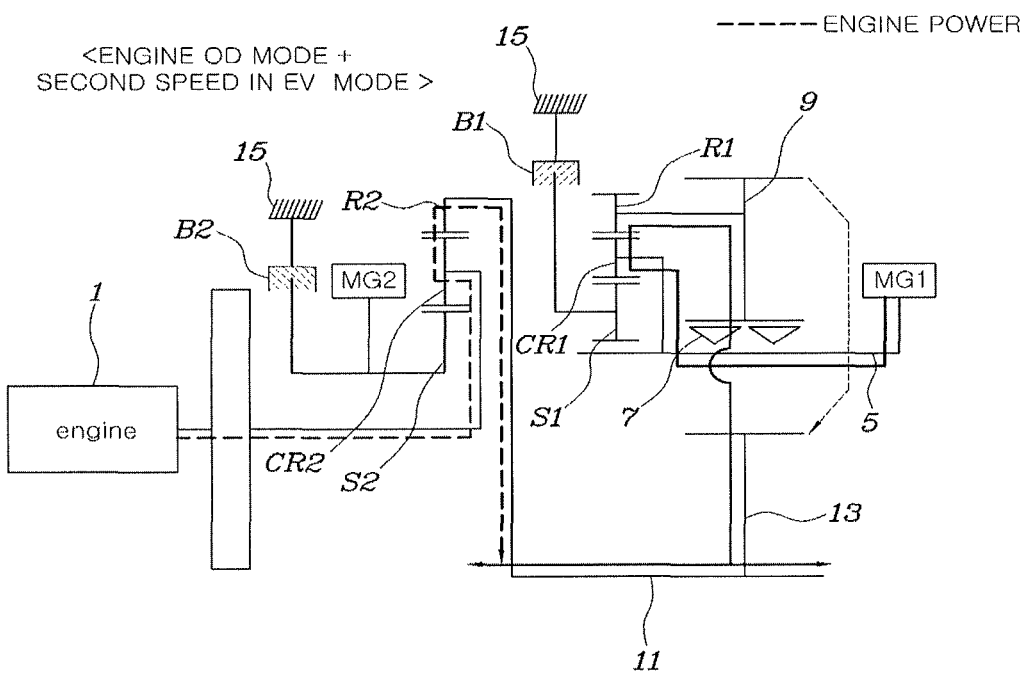

Next, referring to FIG. 5B, when power of the engine 1 is input to the second carrier CR2, the power of the engine 1 is increased through the second ring gear R2 and the increased power is provided to the output shaft 11, similarly to the above method.

As such, the vehicle may travel at the second speed in EV mode through the speed change from the first speed in EV mode to the second speed in EV mode by the electric power provided from the first electric motor MG1, as described above. Therefore, the vehicle may travel in a combined mode of the engine EVT mode and the second speed in EV mode.

Particularly, when the vehicle travels at high speed in the engine OD mode, the present invention need not control the second electric motor MG2 for fixing the second sun gear S2 by fixing the second sun gear S2 using the second friction member B2 and increasing the power of the engine 1. Thus, since a loss of electric load used to control the second electric motor MG2 is decreased, fuel efficiency may be improved.

In addition, although not shown in the drawings, the first electric motor MG1 is freely wheeled by the one-way clutch 7 when the vehicle travels in an engine sole traveling mode of the engine EVT mode. Consequently, since the electric load required to rotate the first electric motor MG1 need not be required, fuel efficiency may be improved as well.

In accordance with the exemplary embodiments of the present invention, a vehicle may travel in an engine EVT (Electrically Variable Transmission) mode or an engine OD (Over Drive) mode, and a speed change is performed in a multistage manner by realization of an HEV mode in such a manner that the vehicle travels at first and second speeds in EV mode. Consequently, EV traveling performance and high traveling performance of the vehicle may be improved and cost and weight of a motor may be reduced by decreasing a capacity of the motor.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid vehicle power train comprising:
   a first planetary gear unit comprising:
   a first rotation element operated as a selective fixed element by a first friction member;
   a second rotation element connected to a first electric motor by an electric input shaft to be operated as an input element; and
   a third rotation element connected to an output shaft through an external gear to be operated as an output element;
   a one-way clutch rotating the external gear relative to the electric input shaft or rotating the external gear along with rotation of the electric input shaft, according to rotational speed of the electric input shaft and the external gear; and a second planetary gear unit including:
 a first rotation element connected to a second electric motor to be operated as a selective input element or a selective fixed element;
 a second rotation element operated as an input element by provision of engine power; and
 a third rotation element connected to the output shaft to be operated as an output element.

2. The hybrid vehicle power train of claim 1, wherein, in the first planetary gear unit, the first rotation element is a sun gear, the second rotation element is a carrier, and the third rotation element is a ring gear.

3. The hybrid vehicle power train of claim 2, wherein the first friction member is a brake fixed to a transmission case.

4. The hybrid vehicle power train of claim 2, wherein in the second planetary gear unit, the first rotation element is a sun gear, the second rotation element is a carrier, and the third rotation element is a ring gear.

5. The hybrid vehicle power train of claim 4, wherein the first rotation element of the second planetary gear unit is connected to a second friction member to be operated as a selective fixed element.

6. The hybrid vehicle power train of claim 5, wherein the second friction member is a brake fixed to a transmission case, or is a dog clutch selectively fastened between the transmission case and the first rotation element.

7. The hybrid vehicle power train of claim 1, wherein the one-way clutch is provided between the electric input shaft and the external gear, and the one-way clutch and the electric input shaft are concentrically formed.

8. The hybrid vehicle power train of claim 7, wherein the external gear is engaged with an output gear provided on the output shaft.

* * * * *